United States Patent
Kobayashi

(10) Patent No.: US 11,970,622 B2
(45) Date of Patent: Apr. 30, 2024

(54) ACTIVE-ENERGY-RAY-CURABLE COMPOSITION, STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

(71) Applicant: RICOH COMPANY, LTD., Tokyo (JP)

(72) Inventor: Hiroki Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1009 days.

(21) Appl. No.: 16/583,942

(22) Filed: Sep. 26, 2019

(65) Prior Publication Data

US 2020/0102466 A1    Apr. 2, 2020

(30) Foreign Application Priority Data

Sep. 28, 2018  (JP) .................................. 2018-185555
Jul. 31, 2019  (JP) .................................. 2019-140505

(51) Int. Cl.
*C09D 11/101*    (2014.01)
*B29C 64/112*    (2017.01)
(Continued)

(52) U.S. Cl.
CPC .......... *C09D 11/101* (2013.01); *B29C 64/255* (2017.08); *B33Y 30/00* (2014.12);
(Continued)

(58) Field of Classification Search
CPC ..... C09D 11/101; C09D 11/30; C09D 11/326; B29C 64/255; B29C 64/112; B33Y 30/00;
(Continued)

(56) References Cited

U.S. PATENT DOCUMENTS

2008/0124483 A1  5/2008  Takabayashi
2015/0291818 A1* 10/2015  Kida .................... C09D 11/101
                                                     347/85
(Continued)

FOREIGN PATENT DOCUMENTS

JP    4748063    5/2011
JP    5649674    11/2014
(Continued)

OTHER PUBLICATIONS

U.S. Appl. No. 16/293,743 filed Mar. 6, 2019.
U.S. Appl. No. 16/269,630 filed Feb. 7, 2019.

*Primary Examiner* — Michael M. Robinson
(74) *Attorney, Agent, or Firm* — Grüneberg and Myers PLLC

(57) ABSTRACT

Provided is an active-energy-ray-curable composition including: a polymerizable monomer having static surface tension of 40 mN/m or greater at 25 degrees C., a content of the polymerizable monomer being 15% by mass or less relative to total amount of the active-energy-ray-curable composition; an organic pigment serving as a colorant, the organic pigment being contained in 2% by mass or greater relative to total amount of the active-energy-ray-curable composition; and a dispersant having amine value of 5 mgKOH/g or greater but 35 mgKOH/g or less, amine value being greater than acid value of the dispersant, the dispersant being contained in 15% by mass or greater but 70% by mass or less relative to mass of the organic pigment, wherein the active-energy-ray-curable composition is substantially free of a surfactant, and wherein a water content in the active-energy-ray-curable composition is 500 ppm by mass or greater but 3,000 ppm by mass or less.

20 Claims, 2 Drawing Sheets

(51) Int. Cl.
  *B29C 64/255* (2017.01)
  *B29K 105/00* (2006.01)
  *B33Y 10/00* (2015.01)
  *B33Y 30/00* (2015.01)
  *B33Y 70/10* (2020.01)
  *B41M 5/00* (2006.01)
  *C09D 11/30* (2014.01)

(52) U.S. Cl.
  CPC ........... *B33Y 70/10* (2020.01); *B41M 5/0023* (2013.01); *C09D 11/30* (2013.01); *B29C 64/112* (2017.08); *B29K 2105/0002* (2013.01); *B33Y 10/00* (2014.12)

(58) Field of Classification Search
  CPC ...... B33Y 70/10; B33Y 10/00; B41M 5/0023; B29K 2105/0002
  See application file for complete search history.

(56) References Cited

U.S. PATENT DOCUMENTS

| | | | |
|---|---|---|---|
| 2017/0342283 A1* | 11/2017 | Takaku | C09D 11/38 |
| 2017/0349772 A1 | 12/2017 | Hirade et al. | |
| 2018/0170061 A1 | 6/2018 | Nakamura et al. | |
| 2018/0208783 A1 | 7/2018 | Takahashi et al. | |
| 2018/0333909 A1 | 11/2018 | Arita et al. | |
| 2019/0023924 A1 | 1/2019 | Yamada | |
| 2019/0031897 A1 | 1/2019 | Hirade et al. | |

FOREIGN PATENT DOCUMENTS

| | | |
|---|---|---|
| JP | 2015-189928 | 11/2015 |
| JP | 2017-136825 | 8/2017 |
| JP | 6281391 | 2/2018 |

\* cited by examiner

ACTIVE-ENERGY-RAY-CURABLE COMPOSITION, STORED CONTAINER, TWO-DIMENSIONAL OR THREE-DIMENSIONAL IMAGE FORMING APPARATUS, TWO-DIMENSIONAL OR THREE-DIMENSIONAL IMAGE FORMING METHOD, CURED PRODUCT, AND PROCESSED PRODUCT

CROSS-REFERENCE TO RELATED APPLICATIONS

The present application claims priority under 35 U.S.C. § 119 to Japanese Patent Application No. 2018-185555 filed Sep. 28, 2018 and Japanese Patent Application No. 2019-140505 filed Jul. 31, 2019. The contents of which are incorporated herein by reference in their entirety.

BACKGROUND OF THE INVENTION

Field of the Invention

The present disclosure relates to an active-energy-ray-curable composition, a stored container, a two-dimensional or three-dimensional image forming apparatus, a two-dimensional or three-dimensional image forming method, a cured product, and a processed product.

Description of the Related Art

In recent years, active-energy-ray-curable inkjet ink compositions excellent in chromogenicity have been demanded particularly in the sign graphics field.

Such active-energy-ray-curable inkjet ink compositions typically contain a surfactant in order to have an improved wetting extendability over media and an improved jetting stability. However, when a surfactant is contained, there is a problem that the chromogenicity is poor in a high density region.

On the other hand, compositions free of a surfactant have a poor pigment dispersibility, and may have troubles related with jetting stability, particularly with magenta pigments.

In order to solve the problem of dispersion stability of inks, for example, there has been proposed an active-ray-curable inkjet ink containing a dispersant that has both of an acid value and an amine value, with the acid value greater than the amine value (for example, see Japanese Patent No. 4748063).

For example, there has also been proposed an active-ray-curable inkjet ink containing a dispersant containing a copolymer that has an amine value of 20 mgKOH/g or less and an acid value of 10 mgKOH/g or less and contains a styrene-derived repeating unit, an unsaturated fatty acid-derived repeating unit containing 12 or more carbon atoms, and a polyalkylene oxide-derived repeating unit containing an ethylenic unsaturated double bond, the number of the styrene-derived repeating unit being from 1 mole through 10 moles and the number of the polyalkylene oxide-derived repeating unit containing an ethylenic unsaturated double bond being from 10 moles through 60 moles relative to 1 mole of the unsaturated fatty acid-derived repeating unit containing 12 or more carbon atoms (for example, see Japanese Patent No. 5649674).

Moreover, for example, there has been proposed a radical-polymerizable ultraviolet-ray-curable inkjet composition in which at least any one of the acid value and the amine value of a pigment dispersant is 10 mgKOH/g or greater, the water content is 0.05% by mass or greater but 1.0% by mass or less relative to the total amount of the ink composition, and a radical-polymerizable compound containing a vinyl ether group and a (meth)acrylate group is contained as a radical-polymerizable compound (for example, see Japanese Patent No. 6281391).

SUMMARY OF THE INVENTION

According to one aspect of the present disclosure, an active-energy-ray-curable composition contains: a polymerizable monomer having a static surface tension of 40 mN/m or greater at 25 degrees C., the content of the polymerizable monomer being 15% by mass or less relative to the total amount of the active-energy-ray-curable composition; an organic pigment serving as a colorant, the organic pigment being contained in 2% by mass or greater relative to the total amount of the active-energy-ray-curable composition; and a dispersant having an amine value of 5 mgKOH/g or greater but 35 mgKOH/g or less, the amine value being greater than an acid value of the dispersant, the dispersant being contained in 15% by mass or greater but 70% by mass or less relative to the mass of the organic pigment. The active-energy-ray-curable composition is substantially free of a surfactant. A water content in the active-energy-ray-curable composition is 500 ppm by mass or greater but 3,000 ppm by mass or less.

DESCRIPTION OF THE EMBODIMENTS (Active-Energy-Ray-Curable Composition)

Figure 1:
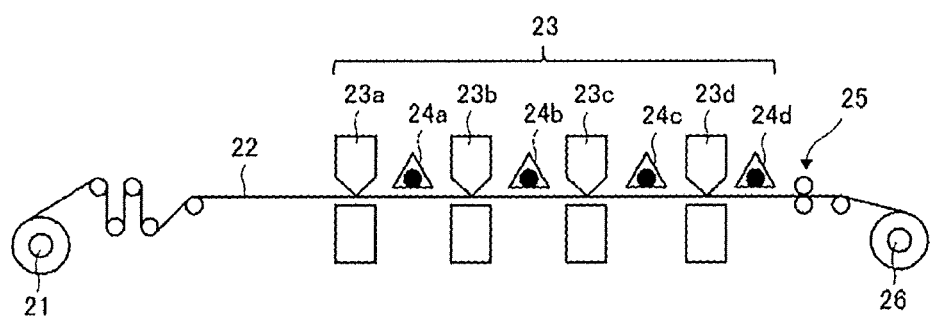
FIG. 1 is a schematic view illustrating an example of a three-dimensional object producing apparatus used in a three-dimensional object producing method of the present disclosure.

An active-energy-ray-curable composition of the present disclosure contains: a polymerizable monomer having a static surface tension of 40 mN/m or greater at 25 degrees C., the content of the polymerizable monomer being 15% by mass or less relative to the total amount of the active-energy-ray-curable composition; an organic pigment serving as a colorant, the organic pigment being contained in 2% by mass or greater relative to the total amount of the active-energy-ray-curable composition; and a dispersant having an amine value of 5 mgKOH/g or greater but 35 mgKOH/g or less, the amine value being greater than an acid value of the dispersant, the dispersant being contained in 15% by mass or greater but 70% by mass or less relative to the mass of the organic pigment. The active-energy-ray-curable composition is substantially free of a surfactant. A water content in the active-energy-ray-curable composition is 500 ppm by mass or greater but 3,000 ppm by mass or less. The composition further contains other components as needed.

The present disclosure has an object to provide an active-energy-ray-curable composition excellent in chromogenicity in a high density region, adhesiveness with a substrate, and jetting stability.

The present disclosure can provide an active-energy-ray-curable composition excellent in chromogenicity in a high density region, adhesiveness with a substrate, and jetting stability.

The existing technique described in Japanese Patent No. 4748063 has a problem that stability of the ink during heating is poor.

The existing technique described in Japanese Patent No. 5649674 has a problem that the dispersion stability of the ink would be poor if moisture in the air was absorbed into the ink during production of the ink, leading to occurrence of abnormal aggregation.

The existing technique described in Japanese Patent No. 6281391 needs to indispensably contain a radical-polymerizable compound containing a vinyl ether group and a (meth)acrylate group as a radical-polymerizable compound. This leads to a poor adhesiveness with a substrate, and judging from Examples, the radical-polymerizable compound cannot be effective unless a dispersant is contained in an amount of 50% by mass or greater relative to the pigment. A high content of the dispersant leads to a failure to closely adhere with a substrate and thickening of the ink.

As can be understood, the existing techniques have not succeeded in providing an active-energy-ray-curable composition having an excellent organic pigment dispersibility and ensured chromogenicity in a high density region and jetting stability even if substantially free of a surfactant.

The present inventors have found that an active-energy-ray-curable composition that contains: a polymerizable monomer having a static surface tension of 40 mN/m or greater at 25 degrees C., the content of the polymerizable monomer being 15% by mass or less relative to the total amount of the active-energy-ray-curable composition; an organic pigment serving as a colorant, the organic pigment being contained in 2% by mass or greater relative to the total amount of the active-energy-ray-curable composition; and a dispersant having an amine value of 5 mgKOH/g or greater but 35 mgKOH/g or less, the amine value being greater than an acid value of the dispersant, the dispersant being contained in 15% by mass or greater but 70% by mass or less relative to the mass of the organic pigment, wherein the active-energy-ray-curable composition is substantially free of a surfactant, and wherein a water content in the active-energy-ray-curable composition is 500 ppm by mass or greater but 3,000 ppm by mass or less is excellent in organic pigment dispersibility and can simultaneously satisfy both of a high chromogenicity in a high density region and jetting stability even if free of a surfactant, and have completed the present disclosure.

The active-energy-ray-curable composition of the present disclosure is substantially free of a surfactant. In the present disclosure, a surfactant refers to a compound having a surface active property, except a so-called "pigment dispersant".

The water content in the active-energy-ray-curable composition of the present disclosure is 500 ppm by mass or greater but 3,000 ppm by mass or less, and preferably 500 ppm by mass or greater but 2,000 ppm by mass or less.

The water content can be measured with, for example, a Karl Fischer moisture titrate.

The active-energy-ray-curable composition of the present disclosure contains a polymerizable monomer having a static surface tension of 40 mN/m or greater at 25 degrees C., and preferably contains a polymerizable monomer having a static surface tension of 30 mN/m or greater but 35 mN/m or less at 25 degrees C., and a polymerizable monomer having a static surface tension of less than 30 mN/m at 25 degrees C. The content of these polymerizable monomers is preferably 50% by mass or greater but 90% by mass or less relative to the total amount of the active-energy-ray-curable composition.

<<Polymerizable Monomer Having Static Surface Tension of 40 mN/m or Greater at 25 Degrees C.>>

Examples of the polymerizable monomer having a static surface tension of 40 mN/m or greater at 25 degrees C. include (meth)acryloyl morpholine and N-vinyl caprolactam. One of these polymerizable monomers may be used alone or two or more of these polymerizable monomers may be used in combination.

The content of the polymerizable monomer having a static surface tension of 40 mN/m or greater at 25 degrees C. is 15% by mass or less, preferably 5% by mass or greater but 15% by mass or less, and more preferably 10% by mass or greater but 15% by mass or less relative to the total amount of the active-energy-ray-curable composition.

When the content of the polymerizable monomer having a static surface tension of 40 mN/m or greater at 25 degrees C. is 15% by mass or less, an active-energy-ray-curable composition excellent in chromogenicity in a high density region and jetting stability can be obtained.

The static surface tension can be measured with, for example, a static surface tension measuring instrument at 25 degrees C.

<<Polymerizable Monomer Having Static Surface Tension of 30 mN/m or Greater but 35 mN/m or Less at 25 Degrees C.>>

Examples of the polymerizable monomer having a static surface tension of 30 mN/m or greater but 35 mN/m or less at 25 degrees C. include isobornyl (meth)acrylate and lauryl (meth)acrylate. One of these polymerizable monomers may be used alone or two or more of these polymerizable monomers may be used in combination.

The content of the polymerizable monomer having a static surface tension of 30 mN/m or greater but 35 mN/m or less at 25 degrees C. is preferably 15% by mass or greater, preferably 15% by mass or greater but 40% by mass or less, and more preferably 20% by mass or greater but 30% by mass or less relative to the total amount of the active-energy-ray-curable composition.

When the content of the polymerizable monomer having a static surface tension of 30 mN/m or greater but 35 mN/m or less at 25 degrees C. is 15% by mass or greater, an active-energy-ray-curable composition excellent in chromogenicity in a high density region and jetting stability can be obtained.

The static surface tension can be measured with, for example, a static surface tension measuring instrument at 25 degrees C.

<<Polymerizable Monomer Having Static Surface Tension of Less than 30 mN/m at 25 Degrees C.>>

Examples of the polymerizable monomer having a static surface tension of less than 30 mN/m at 25 degrees C. include isodecyl (meth)acrylate, isooctyl (meth)acrylate, n-decyl (meth)acrylate, n-octyl (meth)acrylate, isobutyl (meth)acrylate, isononyl (meth)acrylate, and octyl/decyl (meth)acrylate. One of these polymerizable monomers may be used alone or two or more of these polymerizable monomers may be used in combination.

The content of the polymerizable monomer having a static surface tension of less than 30 mN/m at 25 degrees C. is preferably 3% by mass or less and more preferably 1% by mass or greater but 3% by mass or less relative to the total amount of the active-energy-ray-curable composition.

When the content of the polymerizable monomer having a static surface tension of less than 30 mN/m at 25 degrees C. is 3% by mass or less, an active-energy-ray-curable composition excellent in chromogenicity in a high density region and jetting stability can be obtained.

The static surface tension can be measured with, for example, a static surface tension measuring instrument at 25 degrees C.

<<Any Other Polymerizable Monomer>>

The active-energy-ray-curable composition of the present disclosure may contain any other polymerizable monomer than the polymerizable monomer having a static surface tension of 40 mN/m or greater at 25 degrees C., the polymerizable monomer having a static surface tension of 30 mN/m or greater but 35 mN/m or less at 25 degrees C., and the polymerizable monomer having a static surface tension of less than 30 mN/m at 25 degrees C.

As the any other polymerizable monomer, known polymerizable monomers represented by (meth)acrylic acid esters can be used. Examples of the known polymerizable monomers include methyl (meth)acrylate, ethyl (meth)acrylate, allyl (meth)acrylate, glycidyl (meth)acrylate, 2-(dimethylamino)ethyl (meth)acrylate, 2-hydroxyethyl (meth)acrylate, 2-butoxyethyl (meth)acrylate, ethyl carbitol (meth)acrylate, cyclohexyl (meth)acrylate, tetrahydrofurfuryl (meth)acrylate, 2-(2-vinyloxyethoxy)ethyl (meth)acrylate, 2-phenoxyethyl (meth)acrylate, 2-hydroxy-3-phenoxypropyl (meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol is di(meth)acrylate, neopentyl glycol di(meth)acrylate, ethoxylated neopentyl glycol di(meth)acrylate, propoxylated neopentyl glycol di(meth)acrylate, 1,6-hexanediol di(meth)acrylate, and 1,9-nonanediol di(meth)acrylate. One of these polymerizable monomers may be used alone or two or more of these polymerizable monomers may be used in combination.

<Colorant>

As the colorant, various pigments may be used that impart black, white, magenta cyan, yellow, green, orange, and gloss colors such as gold and silver, depending on the intended purpose of the active-energy-ray-curable composition of the present disclosure and requisite properties of the active-energy-ray-curable composition.

As the pigments, organic pigments are used. Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments. One of these organic pigments nay be used alone or two or more of these pigments may be used in combination.

Examples of the organic pigment include Pigment Red 122 (PR122) and Pigment Violet 19 (PV19).

The content of the organic pigment is 2% by mass or greater, preferably 2% by mass or greater but 20% by mass or less, more preferably 2% by mass or greater but 10% by mass or less, and yet more preferably 2% by mass or greater but 5% by mass or less relative to the total amount of the active-energy-ray-curable composition.

<Dispersant>

The active-energy-ray-curable composition of the present disclosure contains a dispersant in order to improve dispersibility of the organic pigment serving as the colorant.

As the dispersant, a dispersant having an amine value of 5 mgKOH/g or greater but 35 mgKOH/g or less, with the amine value greater than the acid value, is used. When a dispersant having an amine value of 5 mgKOH/g or greater but 35 mgKOH/g or less, with the amine value greater than the acid value, is used, there is an advantage that the dispersibility of the pigment is improved.

A dispersant having an amine value of 13 mgKOH/g or greater but 35 mgKOH/g or less, with the amine value greater than the acid value, is preferable. A dispersant having an amine value of 17 mgKOH/g or greater but 30 mgKOH/g or less, with the amine value greater than the acid value, is more preferable. A dispersant having an amine value of 6 mgKOH/g or greater but 16 mgKOH/g or less, with the amine value greater than the acid value, is yet more preferable.

The dispersant is preferably at least any one selected from maleimide-styrene copolymers and ammonium salts of the maleimide-styrene copolymers.

As the dispersant, a commercially available product can be used. Examples of the commercially available product include BYK JET-9150, BYK JET-9151, and BYK JET-9152 (all available from BYK Company, Ltd.), and SOLSPERSE 32000 (available from Lubrizol Corporation).

The content of the dispersant is 15% by mass or greater but 70% by mass or less, preferably 15% by mass or greater but 50% by mass or less, and more preferably 30% by mass or greater but 50% by mass or less relative to the mass of the organic pigment.

<Polymerization Initiator>

The active-energy-ray-curable composition of the present disclosure may contain a polymerization initiator. The polymerization initiator may be referred to simply as initiator. As the polymerization initiator, a photopolymerization initiator is used.

The photopolymerization initiator may be any substance that can produce active species such as radicals and cations in response to the energy of an active energy ray and initiate polymerization of a polymerizable compound (e.g., a monomer and an oligomer). As such a photopolymerization initiator, one, or two or more in combination, selected from, for example, known radical polymerization initiators, cationic polymerization initiators, and base generators may be used. Above all, it is preferable to use radical polymerization initiators.

Examples of radical polymerization initiators include aromatic ketones, acylphosphine oxide compounds, aromatic onium salt compounds, organic peroxides, thio compounds (e.g., thioxanthone compounds and thiophenyl group-containing compounds), hexaaryl biimidazole compounds, ketoxime ester compounds, borate compounds, actinium compounds, metallocene compounds, active ester compounds, carbon-halogen bond-containing compounds, and alkylamine compounds.

The content of the polymerization initiator is preferably 1% by mass or greater but 20% by mass or less, more preferably 3% by mass or greater but 15% by mass or less, and more preferably 5% by mass or greater but 10% by mass or less relative to the total amount of the active-energy-ray-curable composition in terms of achieving a sufficient curing speed.

A polymerization promoter (sensitizer) may be used in combination with the polymerization initiator. The polymerization promotor is not particularly limited and may be appropriately selected depending on the intended purpose. Examples of the polymerization promotor include amine compounds such as trimethylamine, methyl dimethanolamine, triethanolamine, p-diethylaminoacetophenone, ethyl p-dimethyl aminobenzoate, p-dimethylamino benzoic acid-2-ethyl hexyl, N,N-dimethyl benzyl amine, and 4,4'-bis(diethylamino)benzophenone.

The content of the polymerization promotor is not particularly limited and may be appropriately set depending on the polymerization initiator used and the amount of the polymerization initiator.

<Other Components>

The active-energy-ray-curable composition of the present disclosure optionally contains other components. The other components are not particularly limited. Specific examples thereof include, but are not limited to, known articles such as polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, and thickeners.

Among the components of the active-energy-ray-curable composition, low-molecular-weight components such as the polymerizable monomers and the polymerization initiator can be identified by, for example, a gas chromatogram mass spectrometry method.

<Preparation of Active-Energy-Ray-Curable Composition>

The active-energy-ray-curable composition of the present disclosure can be prepared by using the components described above. The preparation devices and conditions are not particularly limited. For example, the active-energy-ray-curable composition can be prepared by subjecting polymerizable monomers, an organic pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerization initiator, and a polymerization inhibitor.

<Viscosity>

The viscosity of the active-energy-ray-curable composition of the present disclosure has no particular limit because it can be adjusted depending on the purpose and application devices. For example, if an ejecting device that ejects the active-energy-ray-curable composition from nozzles is employed, the viscosity thereof is 60 mPa·s or less, preferably in the range of 3 mPa·s to 40 mPa·s, more preferably 5 mPa·s to 30 mPa·s, yet more preferably 5 mPa·s to 15 mPa·s, and particularly preferably 6 mPa·s to 12 mPa·s in the temperature range of 20 degrees C. to 65 degrees C., preferably at 25 degrees C.

In addition, it is particularly preferable to satisfy this viscosity range by the active-energy-ray-curable composition free of the organic solvent described above. Incidentally, the viscosity can be measured by a cone plate rotary viscometer (VISCOMETER TVE-22L, manufactured by TOKI SANGYO CO., LTD.) using a cone rotor (1° 34'× R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Curing Unit>

Examples of a curing unit configured to cure the active-energy-ray-curable composition of the present disclosure include curing by active energy rays.

Active energy rays used for curing the active-energy-ray-curable composition of the present disclosure are not particularly limited, so long as they are able to give necessary energy for allowing polymerization reaction of polymerizable components in the active-energy-ray-curable composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Application Field>

The application field of the active-energy-ray-curable composition of the present disclosure is not particularly limited. It can be applied to any field where active-energy-ray-curable compositions are used. For example, the active-energy-ray-curable composition is selected to a particular application and used for a sign graphics field, a resin for processing, a paint, an adhesive, an insulant, a releasing agent, a coating material, a sealing material, various resists, and various optical materials.

Figure 2:
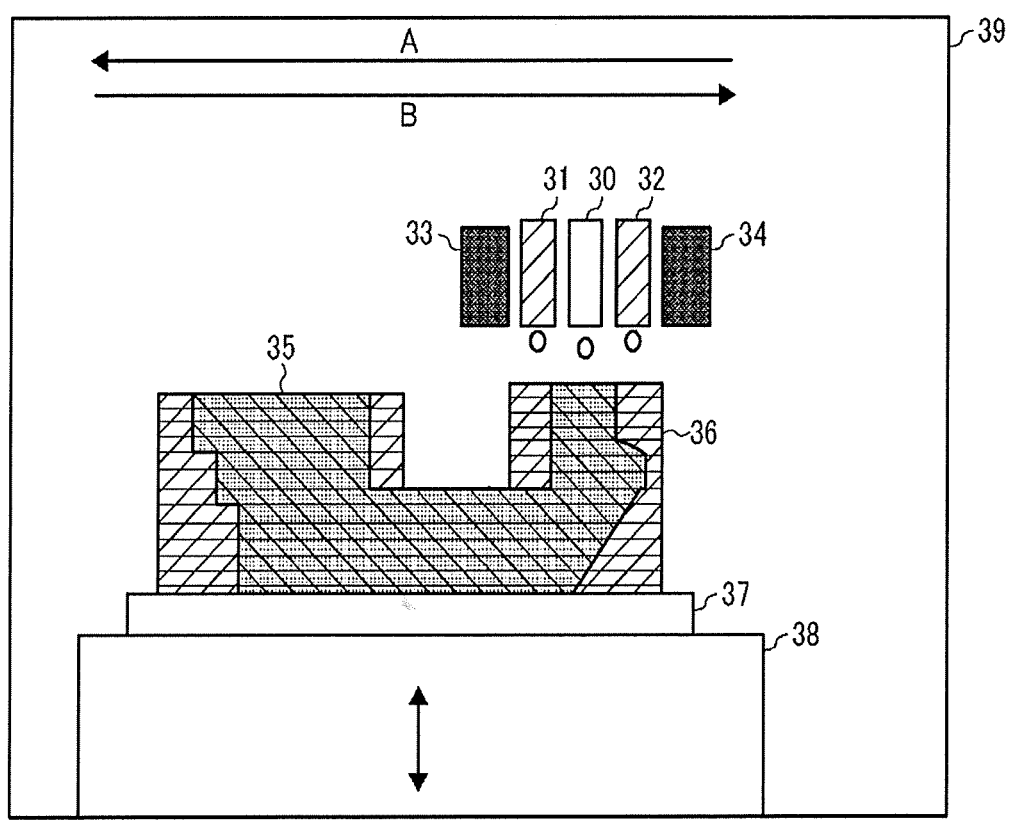
FIG. 2 is a schematic view illustrating another example of a three-dimensional object producing apparatus used in a three-dimensional object producing method of the present disclosure.
Figure 3A:
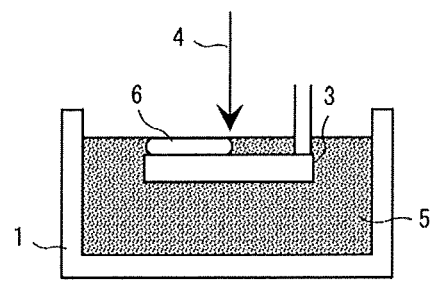
FIG. 3A is a schematic view illustrating an example of a three-dimensional object producing method using an active-energy-ray-curable composition of the present disclosure.
Figure 3B:
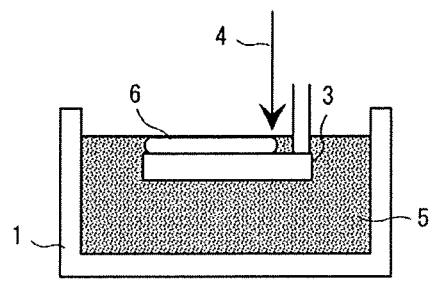
FIG. 3B is a schematic view illustrating an example of a three-dimensional object producing method using an active-energy-ray-curable composition of the present disclosure.
Figure 3C:
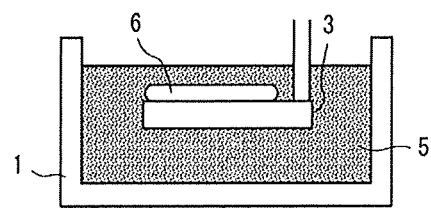
FIG. 3C is a schematic view illustrating an example of a three-dimensional object producing method using an active-energy-ray-curable composition of the present disclosure.
Figure 3D:
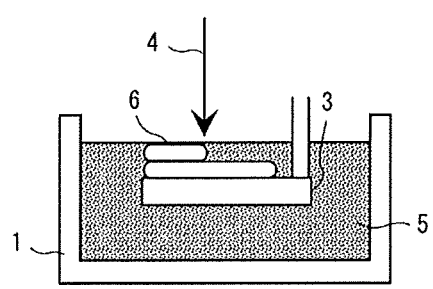
FIG. 3D is a schematic view illustrating an example of a three-dimensional object producing method using an active-energy-ray-curable composition of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating jetting the active-energy-ray-curable composition of the present disclosure to particular areas followed by curing upon irradiation of an active energy ray (to be described in detail below). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active-energy-ray-curable composition 5 of the present disclosure with the active energy ray 4.

In addition, the present disclosure includes cured products obtained by curing the active-energy-ray-curable composition of the present disclosure and processed products obtained by drawing the cured products.

It is preferable that after the active-energy-ray-curable composition is applied and cured over a plastic substrate, a cured product be able to be continuously drawn by 100% or greater but 1,000% or less during heat treatment of the plastic substrate.

The processed product is fabricated by, for example, heat-drawing and punching a cured product or structure having a sheet-like form or film-like form. Examples thereof are products that need processing after decoration of the surface, such as gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<<Stored Container>>

The stored container of the present disclosure refers to a container that is in a state that the active-energy-ray-curable composition of the present disclosure is contained, and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

(Two-Dimensional or Three-Dimensional Image Forming Method and Two-Dimensional or Three-Dimensional Image Forming Apparatus)

A two-dimensional or three-dimensional image forming apparatus of the present disclosure includes a storing part configured to store the active-energy-ray-curable composition of the present disclosure, an applying unit configured to apply the active-energy-ray-curable composition, and a curing unit configured to cure the active-energy-ray-curable composition, and further includes other units as needed.

A two-dimensional or three-dimensional image forming method of the present disclosure includes an applying step of applying the active-energy-ray-curable composition of the present disclosure and a curing step of curing the active-energy-ray-curable composition, and further includes other steps as needed.

The two-dimensional or three-dimensional image forming method of the present disclosure may use active energy rays or heating. In order to cure the active-energy-ray-curable composition of the present disclosure with active energy rays, an irradiating step of irradiating the active-energy-ray-curable composition with active energy rays may be provided, the two-dimensional or three-dimensional image forming apparatus of the present disclosure may include an irradiating unit configured to irradiate the active-energy-ray-curable composition with active energy rays and a storing part configured to store the active-energy-ray-curable composition of the present disclosure, and the container may be accommodated in the storing part. Further, a jetting step of jetting the active-energy-ray-curable composition of the present disclosure and a jetting unit may be provided. The jetting method is not particularly limited and examples of the jetting method include a continuous jetting method and an on-demand method. Examples of the on-demand method include a piezo method, a thermal method, and an electrostatic method.

(Three-Dimensional Object Producing Method)

A three-dimensional object producing method of the present disclosure includes an object producing step of producing a three-dimensional object using the active-energy-ray-curable composition of the present disclosure, and further includes other steps as needed.

It is preferable to perform the object producing step using a three-dimensional printer, but it is also possible to perform the object producing step using a molding die.

A three-dimensional object producing apparatus configured to produce a three-dimensional object using the active-energy-ray-curable composition of the present disclosure is not particularly limited, may be appropriately selected depending on the intended purpose, and may include a storing part configured to store the active-energy-ray-curable composition of the present disclosure, a jetting unit configured to jet the active-energy-ray-curable composition, and a curing unit configured to cure the active-energy-ray-curable composition.

FIG. 1 is a diagram illustrating an example of a three-dimensional object forming apparatus equipped with an inkjet jetting device. Printing units 23a, 23b, 23c, and 23d respectively having ink cartridges and jetting heads for yellow, magenta, cyan, and black active-energy-ray-curable inks jet the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing units 23a, 23b, 23c and 23d may have a heating mechanism to liquidize the ink at the ink jetting portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include jetting an ink onto a recording medium by moving the head while the recording medium intermittently moves according to the width of a jetting head. The line methods include jetting an ink onto a recording medium from a jetting head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metals or ceramics. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating an example of the three-dimensional object forming apparatus of the present disclosure. Using a head unit having inkjet heads arranged movable in the directions indicated by the arrows A and B, an image forming apparatus 39 illustrated in FIG. 2 performs a step of jetting a first composition from an ejection head unit 30 for additive manufacturing and jetting and a first composition from ejection head units 31 and 32 for support, and irradiating and solidifying the first compositions with active energy rays to form a first additive manufacturing layer. This step is repeated multiple times lowering the stage 38 movable in the vertical direction to laminate supporting layers and additive manufacturing layers to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

EXAMPLES

The present disclosure will be described below by way of Examples. The present disclosure should not be construed as being limited to these Examples.

<Measurement of Static Surface Tension of Polymerizable Monomers>

The static surface tension of the polymerizable monomers was measured by a plate method, using CBVP-Z available from Kyowa Interface Science, Inc.

<Measurement of Amine Value of Dispersant>

The amine value of the dispersant was measured by dissolving the dispersant (1 g) in methyl isobutyl ketone (100 mL), performing potential difference measurement by potentiometric titration using an automatic titrator (instrument name: GT-200, available from Mitsubishi Chemical Analytech Co., Ltd.) and a chloric acid methyl isobutyl ketone solution (0.01 moles/L), and calculating the amine value based on the potential difference obtained.

<Measurement of Acid Value of Dispersant>

The acid value of the dispersant was measured by dissolving the dispersant (1 g) in methyl isobutyl ketone (100 mL), performing potential difference measurement by potentiometric titration using an automatic titrator (instrument name: GT-200, available from Mitsubishi Chemical Analytech Co., Ltd.) and a chloric acid methyl isobutyl ketone solution (0.01 moles/L), and calculating the acid value based on a potential difference obtained.

<Measurement of Water Content>

The water content in the active-energy-ray-curable composition was measured with a Karl Fischer moisture titrate (available from Kyoto Electronic Manufacturing Co., Ltd.).

Examples 1-17 and Comparative Examples 1 to 10

Active-energy-ray-curable compositions of Examples 1 to 17 and Comparative Examples 1 to 10 were prepared according to the fixed rule based on the components and contents described in Table 1 to Table 3.

Next, various properties of each of the active-energy-ray-curable compositions obtained were evaluated in the manners described below. The results are presented in Table 1 to Table 3.

<Viscosity>

The viscosity of each active-energy-ray-curable composition measured with a viscometer (available from Toki Sangyo Co., Ltd., VISCOMETER TVE-22L, with a cone rotor: 1° 34'×R24) at a sample temperature of 40 degrees C. at a number of rotation of 50 rpm was evaluated according to the criteria described below.

[Evaluation Criteria]

S: The viscosity at 40 degrees C. was 10 mPa·s or greater but less than 11 mPa·s.

A: The viscosity at 40 degrees C. was 10 mPa·s or greater but less than 13 mPa·s.

B: The viscosity at 40 degrees C. was 8 mPa·s or greater but less than 10 mPa·s, or 13 mPa·s or greater but less than 14 mPa·s.

C: The viscosity at 40 degrees C. was less than 8 mPa·s or 14 mPa·s or greater.

<Chromogenicity in High Density Region>

Using an inkjet printing apparatus equipped with a GEN 5 head available from Ricoh Company, Ltd., a solid image was printed with each active-energy-ray-curable composition at a resolution of 600 dpi×1,200 dpi in a manner that the amount of the ink to be attached would be 1.7 mg/cm$^2$. The solid image was measured with X RITE EXACT (available from X Rite Inc.), to obtain a* and b* values. Based on these values, a saturation c* was calculated according to a calculation formula $c^* = \sqrt{\{(a^*)^2 + (b^*)^2\}}$, to evaluate chromogenicity in a high density region according to the criteria described below.

[Evaluation Criteria]

—For Cyan—

SS: The saturation c* was 60 or higher.
S: The saturation c* was 55 or higher but lower than 60.
A: The saturation c* was 50 or higher but lower than 55.
B: The saturation c* was 45 or higher but lower than 50.
C: The saturation c* was lower than 45

—For Magenta—

SS: The saturation c* was 75 or higher.
S: The saturation c* was 70 or higher but lower than 75.
A: The saturation c* was 65 or higher but lower than 70.
B: The saturation c* was 60 or higher but lower than 65.
C: The saturation c* was lower than 60.

—For Yellow—

SS: The saturation c* was 95 or higher.
S: The saturation c* was 90 or higher but lower than 95.
A: The saturation c* was 85 or higher but lower than 90.
B: The saturation c* was 80 or higher but lower than 85.
C: The saturation c* was lower than 80.

<Jetting Stability>

Using an inkjet apparatus equipped with a GEN 5 head available from Ricoh Company, Ltd., each active-energy-ray-curable composition was continuously jetd for 1 minute at a frequency of 20 kHz under a condition that the jetting speed of the active-energy-ray-curable composition would be 7 m/s±1 m/s, to measure the number of nozzles that failed to jet, to evaluate jetting stability according to the criteria described below.

[Evaluation Criteria]

S: The number of nozzles that failed to jet was 0.
A: The number of nozzles that failed to jet was 1 or more but less than 3.
B: The number of nozzles that failed to jet was 3 or more but less than 10.
C: The number of nozzles that failed to jet was 10 or greater.

<Adhesiveness with Substrate>

Using an inkjet printing apparatus equipped with a GEN 5 head available from Ricoh Company, Ltd., a solid image was printed with each active-energy-ray-curable composition at a resolution of 600 dpi×1,200 dpi in a manner that the amount of the ink to be attached would be 1.7 mg/cm². The solid image was evaluated according to the criteria described below by a cross-cut test method stipulated by JIS-K5600-5-6.

[Evaluation Criteria]
A: Class 0 or 1
B: Class 2
C: Class 3, 4, or 5.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Polymerizable monomer having surface tension of 40 mN/m or greater | NVC | | 3 | | 3 | 3 | 3 | 3 | 3 | 3 | 3 |
| | ACMO | 15 | 3 | | 3 | 3 | 3 | 3 | 3 | 3 | 3 |
| Polymerizable monomer having surface tension of 30 mN/m or greater but 35 mN/m or less | IBXA | | | | | | | | 5 | 15 | |
| | LA | | | | | | | | | | 5 |
| Polymerizable monomer having surface tension of less than 30 mN/m | ODA-N | | | | | | | | | | |
| | IDA | | | | | | | | | | |
| | IOA | | | | | | | | | | |
| Other polymerizable monomers | PEA | 35.5 | 44.5 | 50.5 | 43.4 | 43.8 | 44.2 | 44.5 | 39.5 | 29.5 | 39.5 |
| | CTFA | 10 | 10 | 10 | 10 | 10 | 10 | 10 | 10 | 10 | 10 |
| | THFA | 15 | 15 | 15 | 15 | 15 | 15 | 15 | 15 | 15 | 15 |
| | DPGDA | 10 | 10 | | | | | | | 10 | |
| | DCPDA | | | 10 | 10 | 10 | 10 | 10 | 10 | | 10 |
| Polymerization inhibitor | TBH | 0.2 | | 0.2 | | 0.2 | | 0.2 | | 0.2 | |
| | MEHQ | | 0.2 | | 0.2 | | 0.2 | | 0.2 | | 0.2 |
| Polymerization initiator | DAIDO UV-CURE APO | 10 | 10 | 10 | 10 | 10 | 10 | 10 | 10 | 10 | 10 |
| | DAIDO DETX | 2 | 2 | 2 | 2 | 2 | 2 | 2 | 2 | 2 | 2 |
| Surfactant | BYK 3500 | | | | | | | | | | |
| Colorant | Pigment PR122 | 2 | 2 | 2 | 2 | 2 | 2 | | 2 | 2 | 2 |
| | Pigment PV19 | | | | | | | 2 | | | |
| Dispersant | BYK JET-9151 | 0.3 | 0.3 | 0.3 | 1.4 | 1.0 | 0.6 | 0.3 | 0.3 | 0.3 | 0.3 |
| | BYK JET-9150 | | | | | | | | | | |
| | SOLSPERSE 32000 | | | | | | | | | | |
| | SOLSPERSE 24000 | | | | | | | | | | |
| | PB821 | | | | | | | | | | |
| Water | Water content (ppm by mass) | 3,000 | 1,500 | 500 | 1,500 | 1,500 | 1,500 | 1,500 | 1,500 | 1,500 | 1,500 |
| Evaluation results | Viscosity | S | S | S | B | A | S | S | S | S | S |
| | Chromogenicity in high density region | A | A | A | A | A | A | B | S | SS | S |
| | Jetting stability | B | A | S | S | S | S | A | A | A | A |
| | Adhesiveness with substrate | B | B | B | B | B | B | B | A | A | A |

TABLE 2

| | | Ex. 11 | Ex. 12 | Ex. 13 | Ex. 14 | Ex. 15 | Ex. 16 | Ex. 17 |
|---|---|---|---|---|---|---|---|---|
| Polymerizable monomer having surface tension of 40 mN/m or greater | NVC | 3 | 3 | 3 | 3 | 3 | 3 | 3 |
| | ACMO | 3 | 3 | 3 | 3 | 3 | 3 | 3 |
| Polymerizable monomer having surface tension of 30 mN/m or greater but 35 mN/m or less | IBXA | | | | 5 | | | |
| | LA | | | | | | | |
| Polymerizable monomer having surface tension of less than 30 mN/m | ODA-N | 1 | 3 | 3 | | | | |
| | IDA | | | | 3 | | | |
| | IOA | | | | | 3 | | |

TABLE 2-continued

|  |  | Ex. | | | | | | |
| --- | --- | --- | --- | --- | --- | --- | --- | --- |
|  |  | 11 | 12 | 13 | 14 | 15 | 16 | 17 |
| Other polymerizable monomers | PEA | 43.5 | 41.5 | 36.5 | 44.5 | 44.5 | 44.5 | 44.5 |
|  | CTFA | 10 | 10 | 10 | 10 | 10 | 10 | 10 |
|  | THFA | 15 | 15 | 15 | 15 | 15 | 15 | 15 |
|  | DPGDA | 10 | 10 | 10 | 10 | 10 | 10 | 10 |
|  | DCPDA |  |  |  |  |  |  |  |
| Polymerization inhibitor | TBH | 0.2 |  | 0.2 |  | 0.2 |  | 0.2 |
|  | MEHQ |  | 0.2 |  | 0.2 |  | 0.2 |  |
| Polymerization initiator | DAIDO UV-CURE APO | 10 | 10 | 10 | 10 | 10 | 10 | 10 |
|  | DAIDO DETX | 2 | 2 | 2 | 2 | 2 | 2 | 2 |
| Surfactant | BYK 3500 |  |  |  |  |  |  |  |
| Colorant | Pigment PR122 | 2 | 2 | 2 | 2 | 2 | 2 | 2 |
|  | Pigment PV19 |  |  |  |  |  |  |  |
| Dispersant | BYK JET-9151 | 0.3 | 0.3 | 0.3 | 0.3 | 0.3 |  |  |
|  | BYK JET-9150 |  |  |  |  |  | 0.3 |  |
|  | SOLSPERSE 32000 |  |  |  |  |  |  | 0.3 |
|  | SOLSPERSE 24000 |  |  |  |  |  |  |  |
|  | PB821 |  |  |  |  |  |  |  |
| Water | Water content (ppm by mass) | 1,500 | 1,500 | 1,500 | 1,500 | 1,500 | 1,500 | 1,500 |
| Evaluation results | Viscosity | S | S | S | S | S | S | S |
|  | Chromogenicity in high density region | S | S | SS | S | S | A | A |
|  | Jetting stability | A | A | A | A | A | B | B |
|  | Adhesiveness with substrate | B | B | B | B | B | B | B |

TABLE 3

|  |  | Comp. Ex. | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Polymerizable monomer having surface tension of 40 mN/m or greater | NVC |  | 30 | 3 | 3 | 3 | 3 | 3 | 3 | 3 | 15 |
|  | ACMO | 18 |  | 3 | 3 | 3 | 3 | 3 | 3 | 3 | 15 |
| Polymerizable monomer having surface tension of 30 mN/m or greater but 35 mN/m or less | IBXA |  |  |  |  |  |  |  |  |  |  |
|  | LA |  |  |  |  |  |  |  |  |  |  |
| Polymerizable monomer having surface tension of less than 30 mN/m | ODA-N |  |  |  |  |  |  |  |  |  |  |
|  | IDA |  |  |  |  |  |  |  |  |  |  |
|  | IOA |  |  |  |  |  |  |  |  |  |  |
| Other polymerizable monomers | PEA | 32.5 | 20.5 | 45 | 44.6 | 43.3 | 44.5 | 44.5 | 44.5 | 44.4 | 20.4 |
|  | CTFA | 10 | 10 | 10 | 10 | 10 | 10 | 10 | 10 | 10 | 10 |
|  | THFA | 15 | 15 | 15 | 15 | 15 | 15 | 15 | 15 | 15 | 15 |
|  | DPGDA | 10 |  | 10 |  | 10 |  |  | 10 |  |  |
|  | DCPDA |  | 10 |  | 10 |  | 10 | 10 |  | 10 | 10 |
| Polymerization inhibitor | TBH | 0.2 |  | 0.2 |  | 0.2 |  | 0.2 |  | 0.2 |  |
|  | MEHQ |  | 0.2 |  | 0.2 |  | 0.2 |  | 0.2 |  | 0.2 |
| Polymerization initiator | DAIDO UV-CURE APO | 10 | 10 | 10 | 10 | 10 | 10 | 10 | 10 | 10 | 10 |
|  | DAIDO DETX | 2 | 2 | 2 | 2 | 2 | 2 | 2 | 2 | 2 | 2 |
| Surfactant | BYK 3500 |  |  |  |  |  |  |  |  | 0.1 | 0.1 |
| Colorant | Pigment PR122 | 2 | 2 | 1.5 | 2 | 2 | 2 | 2 | 2 | 2 | 2 |
|  | Pigment PV19 |  |  |  |  |  |  |  |  |  |  |
| Dispersant | BYK JET-9151 | 0.3 | 0.3 | 0.3 | 0.2 | 1.5 |  |  | 0.3 | 0.3 | 0.3 |
|  | BYK JET-9150 |  |  |  |  |  |  |  |  |  |  |
|  | SOLSPERSE 32000 |  |  |  |  |  |  |  |  |  |  |
|  | SOLSPERSE 24000 |  |  |  |  |  | 0.3 |  |  |  |  |
|  | PB821 |  |  |  |  |  |  | 0.3 |  |  |  |
| Water | Water content (ppm by mass) | 4,000 | 5,500 | 1,500 | 1,500 | 1,500 | 1,500 | 1,500 | 4,000 | 1,500 | 5,500 |
| Evaluation results | Viscosity | S | S | S | S | C | S | S | S | S | S |
|  | Chromogenicity in high density region | B | B | C | A | A | A | A | B | C | C |
|  | Jetting stability | C | C | A | C | A | C | C | C | S | S |
|  | Adhesiveness with substrate | B | B | B | B | C | B | B | B | B | B |

Details of the components in Table 1 to Table 3 are as follows.

<Polymerizable Monomer Having Static Surface Tension of 40 mN/m or Greater at 25 Degrees C.>

NVC: N-vinyl caprolactam (available from Ashland Inc., with a static surface tension of 40 mN/m at 25 degrees C.)

ACMO: Acryloyl morpholine (available from KJ Chemicals Corporation, with a static surface tension of 45 mN/m at 25 degrees C.)

<Polymerizable Monomer Having Static Surface Tension of 30 mN/m or Greater but 35 mN/m or Less at 25 Degrees C.>

IBXA: Isobornyl acrylate (available from Osaka Organic Chemical Industry Ltd., with a static surface tension of 30 mN/m at 25 degrees C.)

LA: Lauryl acrylate (available from Osaka Organic Chemical Industry Ltd., with a static surface tension of 30 mN/m at 25 degrees C.)

<Polymerizable Monomer Having Static Surface Tension of Less than 30 mN/m at 25 Degrees C.>

ODA-N: Octyl/decyl acrylate (available from Daicel Corporation, with a static surface tension of 29 mN/m at 25 degrees C.)

IDA: Isodecyl acrylate (available from Osaka Organic Chemical Industry Ltd., with a static surface tension of 28 mN/m at 25 degrees C.)

IOA: Isononyl acrylate (available from Osaka Organic Chemical Industry Ltd., with a static surface tension of 28 mN/m at 25 degrees C.)

<Other Polymerizable Monomers>

PEA: Phenoxyethyl acrylate (available from Osaka Organic Chemical Industry Ltd.)

CTFA: Cyclic trimethylolpropane formal acrylate (available from Osaka Organic Chemical Industry Ltd.)

THFA: Tetrahydrofurfuryl acrylate (available from Osaka Organic Chemical Industry Ltd.)

DPGDA: Dipropylene glycol diacrylate (available from Sartomer)

DCPDA: Dicyclopentanyl diacrylate (available from Nippon Kayaku Co. Ltd.)

<Polymerization Inhibitor>

TBH: 2-Tert-butyl hydroquinone (available from Seiko Chemical Co., Ltd.)

MEHQ: 4-Methoxyphenol (available from Seiko Chemical Co., Ltd.)

<Surfactant>

BYK3500: available from BYK Company, Ltd.

<Pigment>

PR122: available from Clariant Corporation

PV19: available from Clariant Corporation

<Dispersant>

BYK JET-9151: available from BYK Company, Ltd. (with an acid value of 7 mgKOH/g and an amine value of 17 mgKOH/g)

BYK JET-9150: available from BYK Company, Ltd. (with an acid value of 5 mgKOH/g and an amine value of 12 mgKOH/g)

SOLSPERSE 32000: available from Lubrizol Corporation (with an acid value of 15 mgKOH/g and an amine value of 31 mgKOH/g)

SOLSPERSE 24000; available from Lubrizol Corporation (with an acid value of 25 mgKOH/g and an amine value of 42 mgKOH/g)

PB821: available from Ajinomoto Fine-Techno Co., Inc. (with an acid value of 13 mgKOH/g and an amine value of 9 mgKOH/g)

Aspects of the present disclosure are, for example, as follows.

<1> An active-energy-ray-curable composition including:

a polymerizable monomer having a static surface tension of 40 mN/m or greater at 25 degrees C., a content of the polymerizable monomer being 15% by mass or less relative to a total amount of the active-energy-ray-curable composition;

an organic pigment serving as a colorant, the organic pigment being contained in 2% by mass or greater relative to the total amount of the active-energy-ray-curable composition; and a dispersant having an amine value of 5 mgKOH/g or greater but 35 mgKOH/g or less, the amine value being greater than an acid value of the dispersant, the dispersant being contained in 15% by mass or greater but 70% by mass or less relative to a mass of the organic pigment, wherein the active-energy-ray-curable composition is substantially free of a surfactant, and wherein a water content in the active-energy-ray-curable composition is 500 ppm by mass or greater but 3,000 ppm by mass or less.

<2> The active-energy-ray-curable composition according to <1>, wherein the dispersant is contained in 15% by mass or greater but less than 50% by mass relative to the mass of the organic pigment.

<3> The active-energy-ray-curable composition according to <1> or <2>, wherein the dispersant is contained in 30% by mass or greater but less than 50% by mass relative to the mass of the organic pigment.

<4> The active-energy-ray-curable composition according to any one of <1> to <3>, wherein the dispersant has the amine value of 13 mgKOH/g or greater but 35 mgKOH/g or less, the amine value being greater than the acid value.

<5> The active-energy-ray-curable composition according to any one of <1> to <4>, wherein the dispersant has the amine value of 17 mgKOH/g or greater but 30 mgKOH/g or less, the amine value being greater than the acid value.

<6> The active-energy-ray-curable composition according to any one of <1> to <5>, wherein the dispersant has the acid value of 6 mgKOH/g or greater but 16 mgKOH/g or less, the amine value being greater than the acid value.

<7> The active-energy-ray-curable composition according to any one of <1> to <6>, wherein the dispersant is at least any one selected from the group consisting of maleimide-styrene copolymers and ammonium salts of the maleimide-styrene copolymers.

<8> The active-energy-ray-curable composition according to any one of <1> to <7>, including a polymerizable monomer having a static surface tension of 30 mN/m or greater but 35 mN/m or less at 25 degrees C.

<9> The active-energy-ray-curable composition according to <8>, wherein a content of the polymerizable monomer having a static surface tension of 30 mN/m or greater but 35 mN/m or less at 25 degrees C. is 15% by mass or greater relative to the total amount of the active-energy-ray-curable composition.

<10> The active-energy-ray-curable composition according to any one of <1> to <9>, including a polymerizable monomer having a static surface tension of less than 30 mN/m at 25 degrees C., a content of the polymerizable monomer being 1% by mass or greater but 3% by mass or less relative to the total amount of the active-energy-ray-curable composition.

<11> The active-energy-ray-curable composition according to any one of <1> to <10>, wherein the polymerizable monomer having a static surface tension of 40 mN/m or greater at 25 degrees C. is at least one selected from the group consisting of (meth) acryloyl morpholine and N-vinyl caprolactam.

<12> The active-energy-ray-curable composition according to any one of <8> to <11>, wherein the polymerizable monomer having a static surface tension of 30 mN/m or greater but 35 mN/m or less at 25 degrees C. is at least one selected from the group consisting of isobornyl (meth)acrylate and lauryl (meth) acrylate.

<13> The active-energy-ray-curable composition according to any one of <10> to <12>, wherein the polymerizable monomer having a static surface tension of less than 30 mN/m at 25 degrees C. is at least one selected from the group consisting of isodecyl (meth) acrylate, isooctyl (meth)acrylate, n-decyl (meth)acrylate, n-octyl (meth)acrylate, isobutyl (meth)acrylate, and isononyl (meth)acrylate.

<14> The active-energy-ray-curable composition according to any one of <1> to <13>, wherein the organic pigment is Pigment Red 122 (PR122).

<15> The active-energy-ray-curable composition according to any one of <1> to <14>, wherein the active-energy-ray-curable composition is an inkjet ink.

<16> A stored container including:

the active-energy-ray-curable composition according to any one of <1> to <15>; and a container, wherein the active-energy-ray-curable composition is stored in the container.

<17> A two-dimensional or three-dimensional image forming apparatus including:

a storing part configured to store the active-energy-ray-curable composition according to any one of <1> to <15>;

an applying unit configured to apply the active-energy-ray-curable composition; and a curing unit configured to cure the active-energy-ray-curable composition.

<18> A two-dimensional or three-dimensional image forming method including:

applying the active-energy-ray-curable composition according to any one of <1> to <15>; and curing the active-energy-ray-curable composition.

<19> A cured product, wherein the cured product is formed using the active-energy-ray-curable composition according to any one of <1> to <15>.

<20> A processed product, wherein the processed product is obtained by drawing the cured product according to <19>.

<21> A three-dimensional object producing method including producing a three-dimensional object using the active-energy-ray-curable composition according to any one of <1> to <15>.

The active-energy-ray-curable composition according to any one of <1> to <15>, the stored container according to <16>, the two-dimensional or three-dimensional image forming apparatus according to <17>, the two-dimensional or three-dimensional image forming method according to <18>, the cured product according to <19>, the processed product according to <20>, and the three-dimensional object producing method according to <21> can solve the various problems in the related art and achieve the object of the present disclosure.

What is claimed is:

1. An active-energy-ray-curable composition comprising:
   a polymerizable monomer having static surface tension of 40 mN/ni or greater at 25 degrees C., a content of the polymerizable monomer being 15% by mass or less relative to a total amount of the active-energy-ray-curable composition;
   an organic pigment serving as a colorant, the organic pigment being contained in 2% by mass or greater relative to the total amount of the active-energy-ray-curable composition; and
   a dispersant having an amine value of 5 mgKOH/g or greater but 35 mgKOH/g or less, the amine value being greater than an acid value of the dispersant, the dispersant being contained in 15% by mass or greater but 70% by mass or less relative to a mass of the organic pigment,
   wherein the active-energy-ray-curable composition has a surfactant content of less than 0.1% by mass or is free of a surfactant,
   wherein the active-energy-ray-curable composition is free of a radical-polymerizable compound containing a vinyl ether group and a (meth)acrylate group, and
   wherein a water content in the active-energy-ray-curable composition is 500 ppm by mass or greater but 3,000 ppm by mass or less.

2. The active-energy-ray-curable composition according to claim 1,
   wherein the dispersant is contained in 15% by mass or greater but less than 50% by mass relative to the mass of the organic pigment.

3. The active-energy-ray-curable composition according to claim 1,
   wherein the dispersant is contained in 30% by mass or greater but less than 50% by mass relative to the mass of the organic pigment.

4. The active-energy-ray-curable composition according to claim 1,
   wherein the dispersant has the amine value of 13 mgKOH/g or greater but 35 mgKOH/g or less, the amine value being greater than the acid value.

5. The active-energy-ray-curable composition according to claim 1,
   wherein the dispersant has the amine value of 17 mgKOH/g or greater but 30 mgKOH/g or less, the amine value being greater than the acid value.

6. The active-energy-ray-curable composition according to claim 1, wherein the dispersant has the acid value of 6 mgKOH/g or greater but 16 mgKOH/g or less, the amine value being greater than the acid value.

7. The active-energy-ray-curable composition according to claim 1,
   wherein the dispersant comprises at least any one selected from the group consisting of maleimide-styrene copolymers and ammonium salts of the maleimide-styrene copolymers.

8. The active-energy-ray-curable composition according to claim 1, further comprising
   a polymerizable monomer having a static surface tension of 30 mN/m or greater but 35 mN/m or less at 25 degrees C.

9. The active-energy-ray-curable composition according to claim 8,
wherein a content of the polymerizable monomer having a static surface tension of 30 mN/m or greater but 35 mN/m or less at 25 degrees C. is 15% by mass or greater relative to the total amount of the active-energy-ray-curable composition.

10. The active-energy-ray-curable composition according to claim 8,
wherein the polymerizable monomer having a static surface tension of 30 mN/m or greater but 35 mN/m or less at 25 degrees C. comprises at least one selected from the group consisting of isobornyl (meth)acrylate and lauryl (meth)acrylate.

11. The active-energy-ray-curable composition according to claim 1, further comprising a polymerizable monomer having a static surface tension of less than 30 mN/m at 25 degrees C., a content of the polymerizable monomer being 1% by mass or greater but 3% by mass or less relative to the total amount of the active-energy-ray-curable composition.

12. The active-energy-ray-curable composition according to claim 11, wherein the polymerizable monomer having a static surface tension of less than 30 mN/m at 25 degrees C. comprises at least one selected from the group consisting of isodecyl (meth)acrylate, isooctyl (meth)acrylate, n-decyl (meth)acrylate, n-octyl (meth)acrylate, isobutyl (meth)acrylate, and isononyl (meth)acrylate.

13. The active-energy-ray-curable composition according to claim 1, wherein the polymerizable monomer having a static surface tension of 40 mN/m or greater at 25 degrees C. comprises at least one selected from the group consisting of (meth)acryloyl morpholine and N-vinyl caprolactam.

14. The active-energy-ray-curable composition according to claim 1,
wherein the organic pigment comprises Pigment Red 122 (PR122).

15. The active-energy-ray-curable composition according to claim 1,
wherein the active-energy-ray-curable composition is an inkjet ink.

16. A stored container comprising: the active-energy-ray-curable composition according to claim 1; and a container, wherein the active-energy-ray-curable composition is stored in the container.

17. A two-dimensional or three-dimensional image forming method comprising: applying the active-energy-ray-curable composition according to claim 1; and curing the active-energy-ray-curable composition.

18. A cured product,
wherein the cured product is formed using the active-energy-ray-curable composition according to claim 1.

19. A processed product,
wherein the processed product is obtained by drawing the cured product according to claim 18.

20. An active-energy-ray-curable composition comprising:
(meth)acryloyl morpholine as a polymerizable monomer having a static surface tension of 40 mN/m or greater at 25 degrees C., a content of the polyme,rizable monomer being 5% by mass or greater but 15% by mass or less relative to a total amount of the active-energy-ray-curable composition;
an organic pigment serving as a colorant, the organic pigment being contained in 2% by mass or greater relative to the total amount of the active-energy-ray-curable composition; and
a dispersant having an amine value of 5 mgKOH/g or greater but 35 mgKOH/g or less, the amine value being greater than an acid value of the dispersant, the dispersant being contained in 15% by mass or greater but 70% by mass or less relative to a mass of the organic pigment,
wherein the active-energy-ray-curable composition is free of a surfactant,
wherein the active-energy-ray-curable composition is free of a radical-poly erizable compound containing a vinyl ether group and a (meth)acrylate group, and
wherein a water content in the active-energy-ray-curable composition is 500 ppm by mass or greater but 3,000 ppm by mass or less.

* * * * *